United States Patent
Cheng et al.

(10) Patent No.: US 9,544,508 B2
(45) Date of Patent: Jan. 10, 2017

(54) IMAGE SENSOR WHICH CAN ADJUST BRIGHTNESS INFORMATION TO FALL IN A PREDETERMINED RANGE

(71) Applicant: PixArt Imaging Inc., Hsin-Chu (TW)

(72) Inventors: Hsin-Chi Cheng, Hsin-Chu (TW); En-Feng Hsu, Hsin-Chu (TW); Chi-Chieh Liao, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

(21) Appl. No.: 15/073,658

(22) Filed: Mar. 18, 2016

(65) Prior Publication Data

US 2016/0205327 A1 Jul. 14, 2016

Related U.S. Application Data

(62) Division of application No. 14/037,375, filed on Sep. 26, 2013, now Pat. No. 9,350,922.

(30) Foreign Application Priority Data

Mar. 5, 2013 (TW) .............................. 102107708 A

(51) Int. Cl.
- *H04N 5/243* (2006.01)
- *H04N 5/3745* (2011.01)
- *H04N 5/235* (2006.01)
- *H04N 5/378* (2011.01)

(52) U.S. Cl.
CPC ............ *H04N 5/243* (2013.01); *H04N 5/2351* (2013.01); *H04N 5/378* (2013.01); *H04N 5/37455* (2013.01)

(58) Field of Classification Search
CPC ....... H04N 5/243; H04N 5/378; H04N 5/2351
See application file for complete search history.

(56) References Cited

U.S. PATENT DOCUMENTS

| | | |
|---|---|---|
| 5,712,682 A | 1/1998 | Hannah |
| 8,232,955 B2 | 7/2012 | Kwon |
| 8,300,283 B2 | 10/2012 | Tsai |
| 8,773,551 B2 | 7/2014 | Daisuke |

(Continued)

FOREIGN PATENT DOCUMENTS

| | | |
|---|---|---|
| CN | 101729786 A | 6/2010 |
| CN | 102170530 A | 8/2011 |

(Continued)

*Primary Examiner* — Nelson D. Hernández Hernández
(74) *Attorney, Agent, or Firm* — Winston Hsu; Scott Margo

(57) ABSTRACT

An image sensor comprising: an image sensing matrix, comprising at least one image sensing unit, for generating at least one image sensing signal according to a sensed image; an analog to digital converter, for converting the image sensing signal to a digital image sensing signal; an adjusting unit, for adjusting the digital image sensing signal to be an adjusted digital image sensing signal according to at least one adjusting parameter and the digital image sensing signal; an operational circuit, for computing at least part of brightness of the sensed image sensed by the image sensing unit according to the adjusted digital image sensing signal to generate at least one operational brightness signal; and a control unit, for adjusting the adjusting parameter, such that brightness information generated based on brightness values, which corresponds to the operational brightness signal, falls in a predetermined range.

8 Claims, 9 Drawing Sheets

(56) References Cited

U.S. PATENT DOCUMENTS

| | | | |
|---|---|---|---|
| 2004/0046875 A1* | 3/2004 | Itani | H04N 5/243 348/229.1 |
| 2007/0040914 A1 | 2/2007 | Katagiri | |
| 2007/0040922 A1 | 2/2007 | McKee | |
| 2009/0167915 A1 | 7/2009 | Hirota | |
| 2010/0053395 A1 | 3/2010 | Motonaga | |
| 2010/0103280 A1 | 4/2010 | Emori | |
| 2012/0133803 A1 | 5/2012 | Lee | |
| 2012/0176514 A1 | 7/2012 | Tsurube | |

FOREIGN PATENT DOCUMENTS

| | | |
|---|---|---|
| CN | 102484679 A | 5/2012 |
| JP | 2002354347 A | 12/2002 |
| TW | 200713574 | 4/2007 |

\* cited by examiner

IMAGE SENSOR WHICH CAN ADJUST BRIGHTNESS INFORMATION TO FALL IN A PREDETERMINED RANGE

CROSS REFERENCE TO RELATED APPLICATIONS

This application is a divisional application of applicant's earlier application, Ser. No. 14/037,375, filed 2013 Sep. 26, and is included herein by reference.

BACKGROUND OF THE INVENTION

1. Field of the Invention

The present invention relates to an image sensing method and an image sensor utilizing the method, and particularly relates to an image sensing method and an image sensor utilizing the method that can adjust background light image brightness of the image sensor to be more uniform.

2. Description of the Prior Art

An image sensor is an apparatus that can transfer light to voltage charge, and processes the voltage charge to generate digital signals constituting the image. Such kind of digital signals can be stored to a storage apparatus or be output to a display to display an image corresponding to the digital signals. Such technology is applied to various kinds of electronic apparatuses, for example, a digital camera, a video camera, a mobile phone or a mouse.

The image sensor can be applied to touch control technology. FIG. 1 is a schematic diagram illustrating a prior art optical touch control apparatus 100. As shown in FIG. 1, the optical touch control apparatus 100 comprises an image sensor 102, bar shape light guiding devices 105, 109 and light emitting diodes 103, 107, 111, 113. The light guiding devices 105, 109 are provided at two sides of the sensing region 101. The light emitting diodes 103, 107, 111, 113 are located at the ends of the light guiding devices 105, 109, such that the light can be projected to the sensing region 101 via the light guiding devices 105, 109. Also, the image sensor 102 is provided opposite to the light guiding devices 105, 109.

FIG. 2 is a schematic diagram illustrating brightness distribution for the background light image derived by a prior art image sensor. As shown in FIG. 2, the brightness distribution of the background light image is non-uniform. One possible reason for such situation is that the intensities for the light emitted from the light guiding devices 105, 109 are different. Such situation may be caused by other reasons, however. Such informality may cause some problems. For example, if some objects such as a finger is put on the sensing region 101, the light is blocked such that a dark image is formed. For example, the dark image regions $Ob_1$, $Ob_2$, $Ob_3$ and $Ob_4$ in FIG. 2. Therefore, the optical touch control apparatus 100 utilizes the location of the dark image regions to compute the location and the barycentre of the object.

However, if the brightness distribution of the background light image is non-uniform, the location and the barycentre of the object may be wrongly determined. For example, the dark image regions $Ob_1$, $Ob_2$, $Ob_3$ and $Ob_4$ in FIG. 2 indicate the existence of object. The location and the barycentre of the object causing the dark image regions $Ob_1$, $Ob_2$ can be correctly computed since the brightness distribution of the background light image for the locations thereof are uniform. However, the location and the barycentre of the object causing the dark image regions $Ob_3$, $Ob_4$ may be wrongly computed since the brightness distribution of the background light image for the locations thereof are non-uniform.

SUMMARY OF THE INVENTION

Therefore, one objective of the present invention is to provide an image sensor and an image sensing method to control the brightness of the background light image to be more uniform.

Another objective of the present invention is to provide an image sensor and an image sensing method, which set different amplifying ratios to the image sensing units in different rows and columns in the image sensing matrix of the image sensor. Such that the brightness of the background light image can be more uniform.

One embodiment of the present invention discloses an image sensor, which comprises: an image sensing matrix, comprising at least one image sensing unit, for generating at least one image sensing signal according to a sensed image; an analog to digital converter, for converting the image sensing signal to a digital image sensing signal; an adjusting unit, for adjusting the digital image sensing signal to be an adjusted digital image sensing signal according to at least one adjusting parameter and the digital image sensing signal; an operational circuit, for computing at least part of brightness of the sensed image sensed by the image sensing unit according to the adjusted digital image sensing signal to generate at least one operational brightness signal; and a control unit, for adjusting the adjusting parameter, such that brightness information generated based on brightness values, which corresponds to the operational brightness signal, falls in a predetermined range.

Still another embodiment of the present invention discloses an image sensor, comprising: an image sensing matrix, comprising a plurality of image sensing units, for generating a plurality of image sensing signals according to a sensed image; an analog to digital converter, for converting the image sensing signals to a plurality of digital image sensing signals; an adjusting unit, for adjusting the digital image sensing signals to be a plurality of adjusted digital image sensing signals according to a plurality of adjusting parameters and the digital image sensing signals; an operational circuit, for computing at least part of brightness of the sensed image sensed by the image sensing units according to the adjusted digital image sensing signals to generate a plurality of operational brightness signals; wherein the adjusting unit utilizes at least two of the adjusting parameters with different values to adjust two of the image sensing signals.

In view of above-mentioned embodiment, the distribution for the background light image brightness of the image sensing apparatus can be adjusted to be normal via adjusting the amplifying parameter or the adjusting parameter, without complicated computing steps. By this way, the problem of wrongly determining the location and the barycentre of the object can be solved. Additionally, utilizing different amplifying parameters or adjusting parameters to process image sensing signals corresponding to different image sensing units can enlarger the application range for the image sensor of the present invention.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
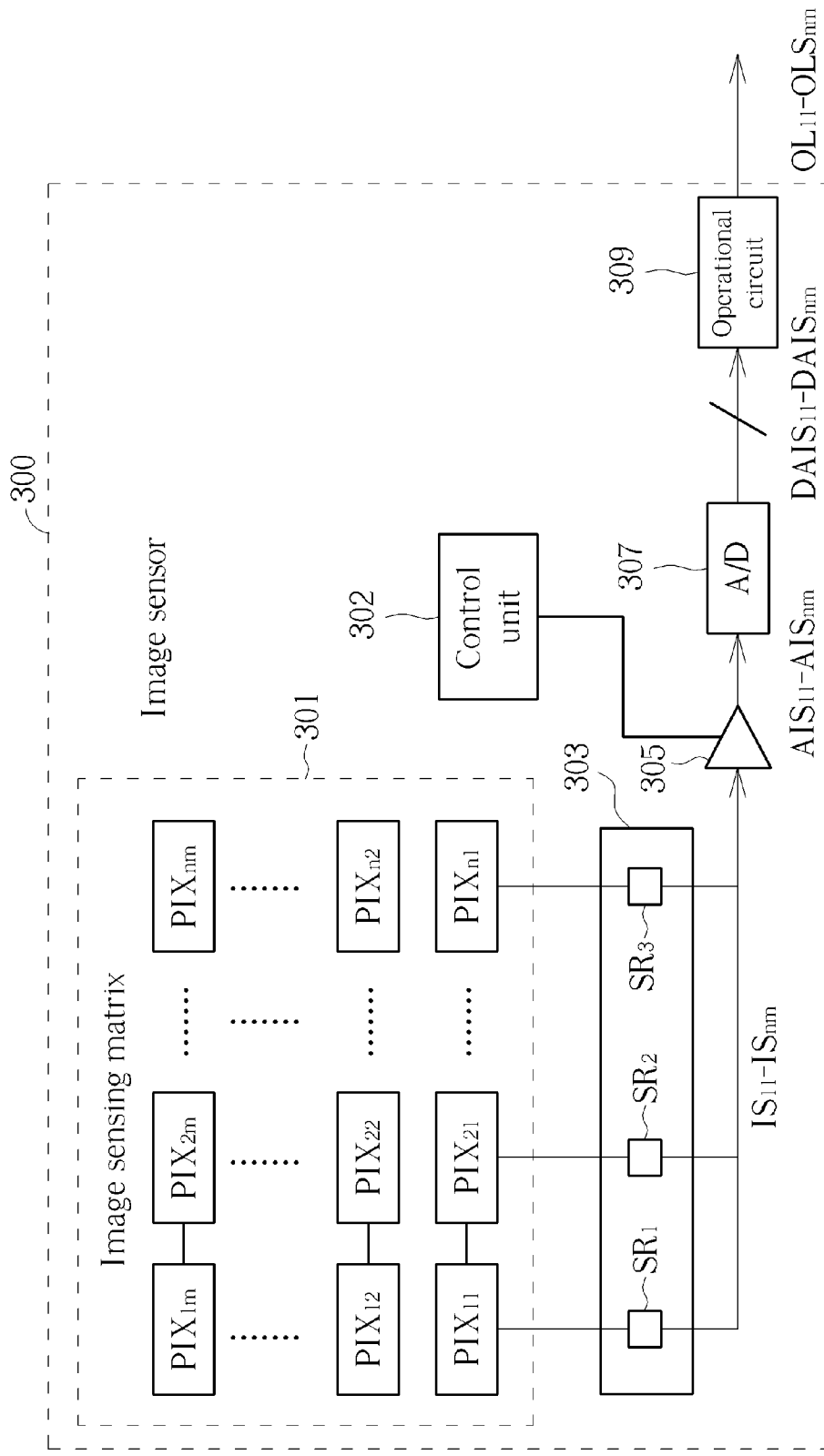
FIG. 3 is a schematic diagram illustrating an image sensor according to one embodiment of the present invention.

FIG. 3 is a schematic diagram illustrating an image sensor 300 according to one embodiment of the present invention. Please note the embodiment in FIG. 3 is only for example and does not mean to limit the scope of the present invention. The image sensor 300 comprises an image sensing matrix 301, a control unit 302, a signal reading circuit 303, an amplifier 305, an analog to digital converter 307 and an operational circuit 309. The image sensing matrix 301 includes at least one image sensing unit $PIX_{11}$-$PIX_{nm}$. In this embodiment, the image sensing units are pixels, and the image sensing matrix is a pixel matrix. The image sensing units can be other pixels, however. The image sensing units $PIX_{11}$-$PIX_{nm}$ generate at least one image sensing signals according to a sensed image. The signal reading circuit 303 is arranged to read the image sensing signals $IS_{11}$-$IS_{nm}$. The amplifier 305 amplifies the image sensing signals $IS_{11}$-$IS_{nm}$ to be amplified image sensing signals $AIS_{11}$-$AIS_{nm}$ according to at least one amplifying parameter. The analog to digital converter 307 transfers the amplified image sensing signals $AIS_{11}$-$AIS_{nm}$ to the digital amplified image sensing signals $DAIS_{11}$-$DAIS_{nm}$. The operational circuit 309 computes at least part of brightness of the sensed image sensed by the image sensing units $PIX_{11}$-$PIX_{nm}$ according to the digital amplified image sensing signals $DAIS_{11}$-$DAIS_{nm}$ to generate at least one operational brightness signal $OL_{11}$-$OL_{nm}$. The operational circuit 309 can be regarded as computing at least part of brightness of the sensed image sensed by the image sensing units $PIX_{11}$-$PIX_{nm}$ according to the amplified image sensing signals $AIS_{11}$-$AIS_{nm}$ to generate at least one operational brightness signal $OL_{11}$-$OL_{nm}$ since the digital amplified image sensing signals $DAIS_{11}$-$DAIS_{nm}$ is a digital version of the amplified image sensing signals $AIS_{11}$-$AIS_{nm}$.

The control unit 302 is arranged to adjust the amplifying parameter of the amplifier 305, such that brightness information generated based on brightness, which corresponds to the operational brightness signals $OL_{11}$-$OL_{nm}$, falls in a predetermined range. For example, the operational brightness signal $OL_{11}$, $OL_{12}$, $OL_{13}$, which have brightness values $Lum_{11}$, $Lum_{12}$ and $Lum_{13}$, are acquired via computing the amplified image sensing signals $AIS_{11}$, $AIS_{12}$, $AIS_{13}$. Therefore, it means the brightness values of the image sensing units $PIX_{11}$, $PIX_{12}$, $PIX_{13}$ are $Lum_{11}$, $Lum_{12}$ and $Lum_{13}$. However, the amplified image sensing signals $AIS_{11}$, $AIS_{12}$, $AIS_{13}$ are adjusted to be amplified image sensing signals $AIS_{11}'$, $AIS_{12}'$, $AIS_{13}'$ after the amplifying parameters are adjusted, thus the brightness values become to $Lum_{11}'$, $Lum_{12}'$ and $Lum_{13}'$, which means the brightness values of the image sensing units $PIX_{11}$, $PIX_{12}$, $PIX_{13}$ are adjusted from $Lum_{11}$, $Lum_{12}$ and $Lum_{13}$ to $Lum_{11}'$, $Lum_{12}'$ and $Lum_{13}'$. The control unit 302 controls the brightness information generated based on the brightness values of the image sensing units $PIX_{11}$-$PIX_{nm}$ to fall in a predetermined range. The brightness information will be described in the following for more detail. Please note the amplifying parameters for amplifying image sensing signals $IS_{11}$-$IS_{nm}$ can be the same but also can be different. In one embodiment, the amplifier 305 utilizes at least two different amplifying parameters to amplify two image sensing signals. For example, utilizing a first amplifying parameter to amplify the image sensing signal $IS_{32}$, but utilizing a second amplifying parameter to amplify the image sensing signal $IS_{46}$. The purpose of such action can be controlling the brightness information generated based on the brightness value of the image sensing units $PIX_{11}$-$PIX_{nm}$ to fall in a predetermined range, the same as above-mentioned purpose, but can be other purposes. Additionally, in another embodiment, the amplifier 305 utilizes at least two of the amplifying parameters with different values to amplify two of the image sensing signals only when the images sensing units are in different rows and different columns.

Figure 4:
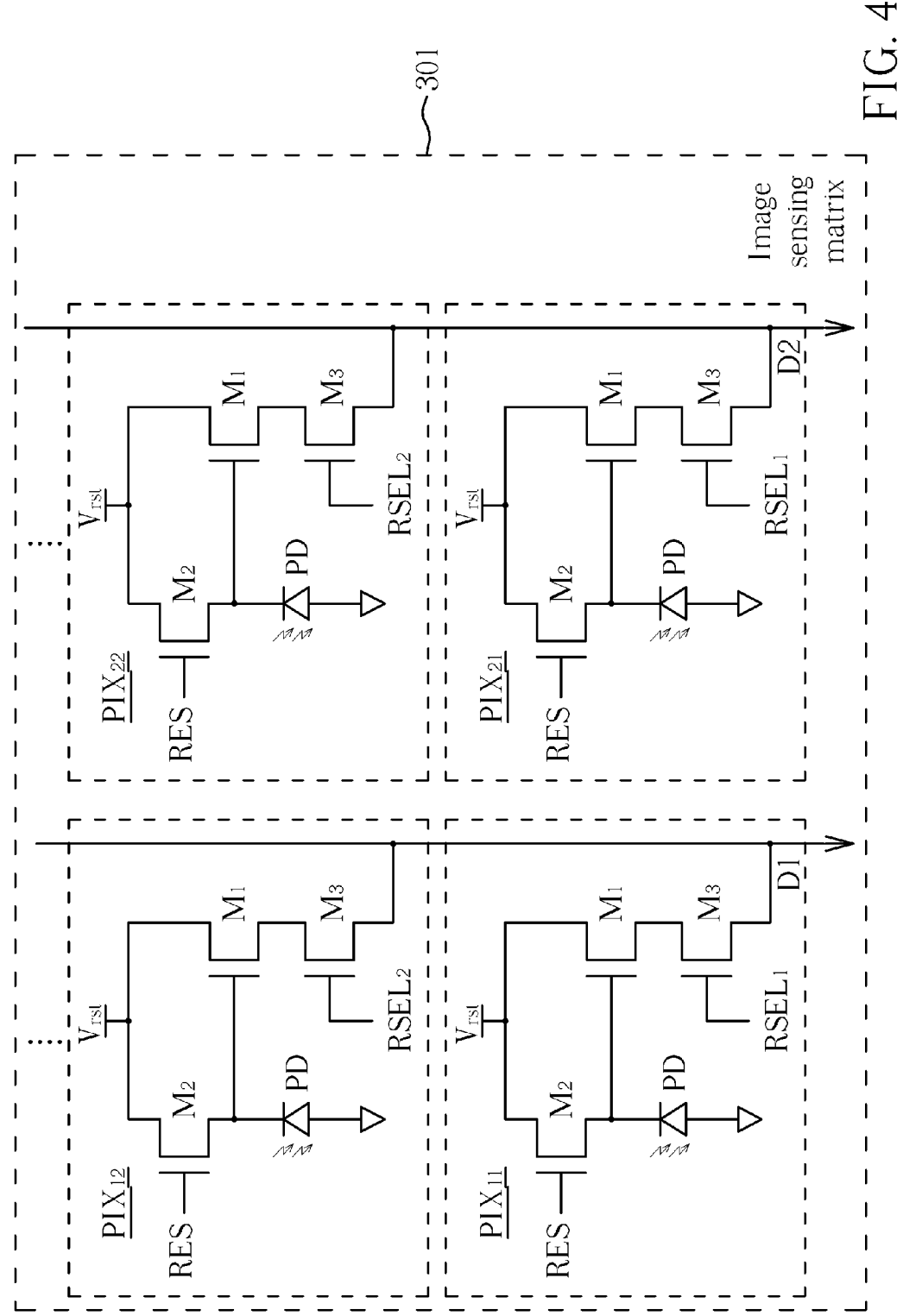
FIG. 4 is an example for the detail structure of the image sensing matrix in FIG. 3.

FIG. 4 is an example for the detail structure of the image sensing matrix 301 in FIG. 3. The cross voltage of the photodiode PD is charged to $V_{rst}$ if the reset signal RES controls the NMOS $M_2$ to be conductive. The signal reading units $SR_1$, $SR_2$, $SR_3$ of the signal reading circuit 303 all comprise a voltage charge storing element. The cross voltage of the photodiode PD is transferred to currents via the NMOS $M_1$ and stored to the voltage charge storing elements in the signal reading units $SR_1$, $SR_2$, $SR_3$, if the sensing unit selecting signals $RSEL_1$ or $RSEL_2$ controls the NMOS $M_3$ to be conductive. Accordingly, the voltage charge stored in the voltage charge storing elements in the signal reading units $SR_1$, $SR_2$, $SR_3$ indicate the light amount sensed by the image sensing units. The voltage charge form the image sensing signals $IS_{11}$-$IS_{nm}$ when the voltage charges are output from the signal reading units $SR_1$, $SR_2$, $SR_3$.

Figure 5:
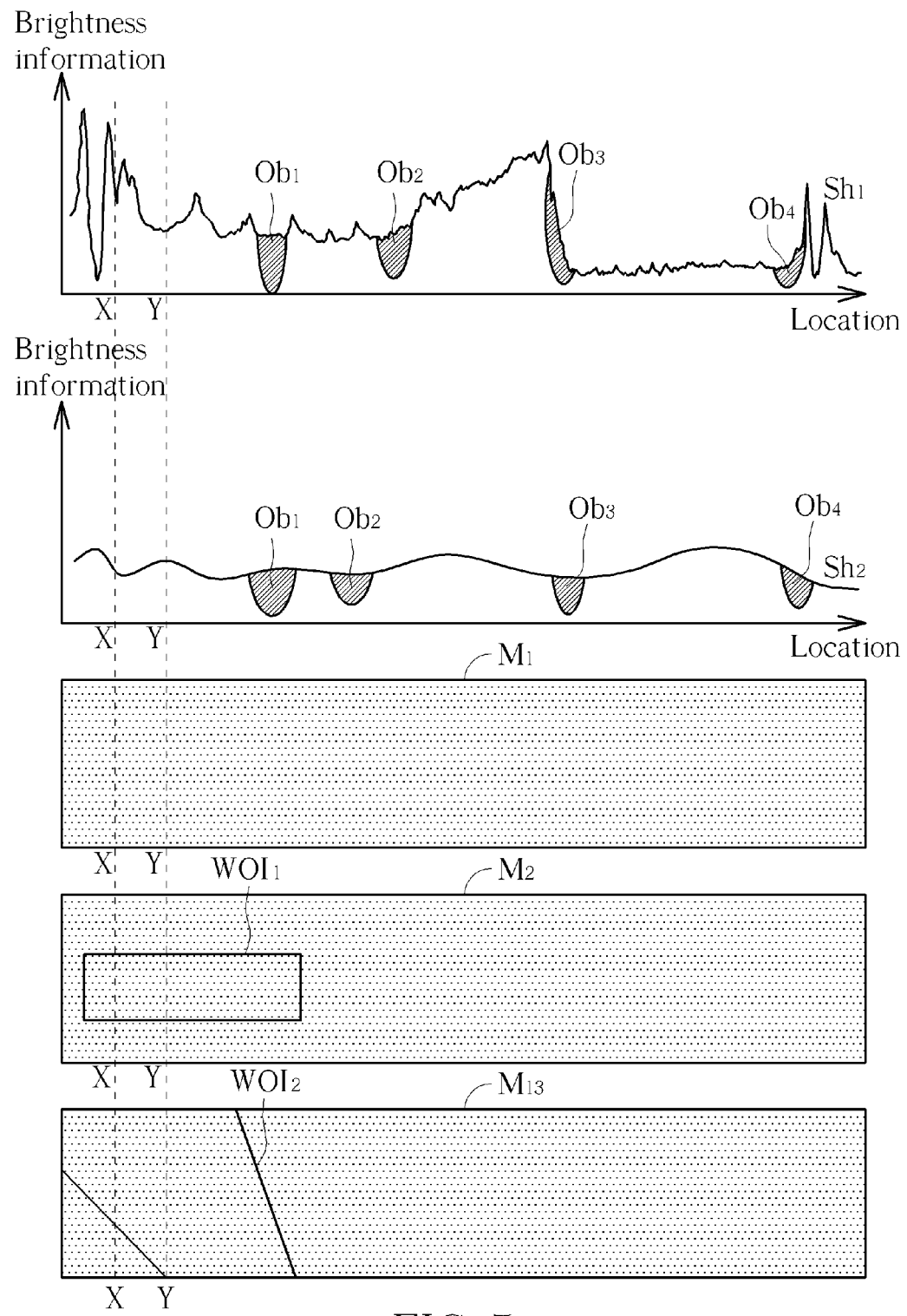
FIG. 5 is a schematic diagram illustrating how to adjust the brightness distribution of the image sensor via adjusting the amplifying parameter in the image sensor.

FIG. 5 is a schematic diagram illustrating how to adjust the brightness distribution of the image sensor via adjusting the amplifying parameter in the image sensor. As shown in FIG. 5, the brightness information diagram for the background light image in the prior art is $Sh_1$, which has a non-uniform distribution. After adjusting the amplifying parameter, the brightness information diagram becomes to have a uniform distribution, such as $Sh_2$. Such brightness information can include various kinds of information generated by the brightness of the image sensing units. In one embodiment, the brightness information is a sum of brightness values for one row or one column of the image sensing matrix. For example, the brightness information for the X, Y locations of the brightness distribution diagram $Sh_2$ indicates the brightness value sum for all the image sensing units in the columns at the X, Y positions in the image sensing matrix $M_1$. In such case, the whole image sensing matrix $M_1$ can be regarded as the image sensing window). In another embodiment, the image sensing matrix $M_2$ utilizes a plurality of image sensing units in an image sensing window $WOI_1$ to sense the image. In such case, the brightness information for the X, Y locations of the brightness distribution diagram $Sh_2$ indicates the brightness value sum for all the image sensing units in the columns at the X, Y positions in the image sensing window $WOI_1$ of the image sensing matrix $M_2$. Also, the number for the image sensing units utilized to generate the brightness information for each row in the image sensing window varies corresponding to the range of the image sensing window. Take FIG. 5 for example, the image sensing window $WOI_2$ is a irregular shape, such that the number for the image sensing units in one row at the X position is fewer than the number for the image sensing units in one row at the Y position.

In one embodiment, the control unit 302 controls the amplifier 305 to utilize one of the amplifying parameters to amplify one of the image sensing signals to form the amplified image sensing signal. That is, the amplified image sensing signals are summed to generate the sum of brightness values after the amplifier 305 amplifies each image sensing signal to generate the amplified image sensing signal. In another embodiment, the control unit 302 controls a plurality of image sensing signals to be summed to form a combinational image sensing signal, such that the amplifier 305 utilizes one of the amplifying parameters to amplify the combinational image sensing signal to generate the amplified image sensing signal. That is, the image sensing signals are amplified to the amplified image sensing signals after summing. The devices for summing the image sensing signals or the amplified image sensing signals are not shown in FIG. 3, but persons skilled in the art will easily understand how to sum the image sensing signals to acquire the sum of brightness values, thus it is omitted for brevity here.

In one embodiment, the brightness information is an average for the brightness values of one row or one column of the image sensor. Alternatively, the brightness information is the difference of the brightness values corresponding to at least two of the operational brightness signals for one row or one column of the image sensor, for example, the difference between the max brightness value and the min brightness value in one row or one column. The image sensing units utilized for computing can locate in a whole row or a whole column of an image sensing matrix, such as the image sensing matrix $M_1$ shown in FIG. 5. Alternatively, the image sensing units utilized for computing can locate in a row or a column of a regular shape image sensing window of an image sensing matrix, such as the image sensing matrix $M_2$ shown in FIG. 5. Additionally, the image sensing units utilized for computing can locate in a row or a column of an irregular shape image sensing window of an image sensing matrix, such as the image sensing matrix $M_3$ shown in FIG. 5.

Figure 6:
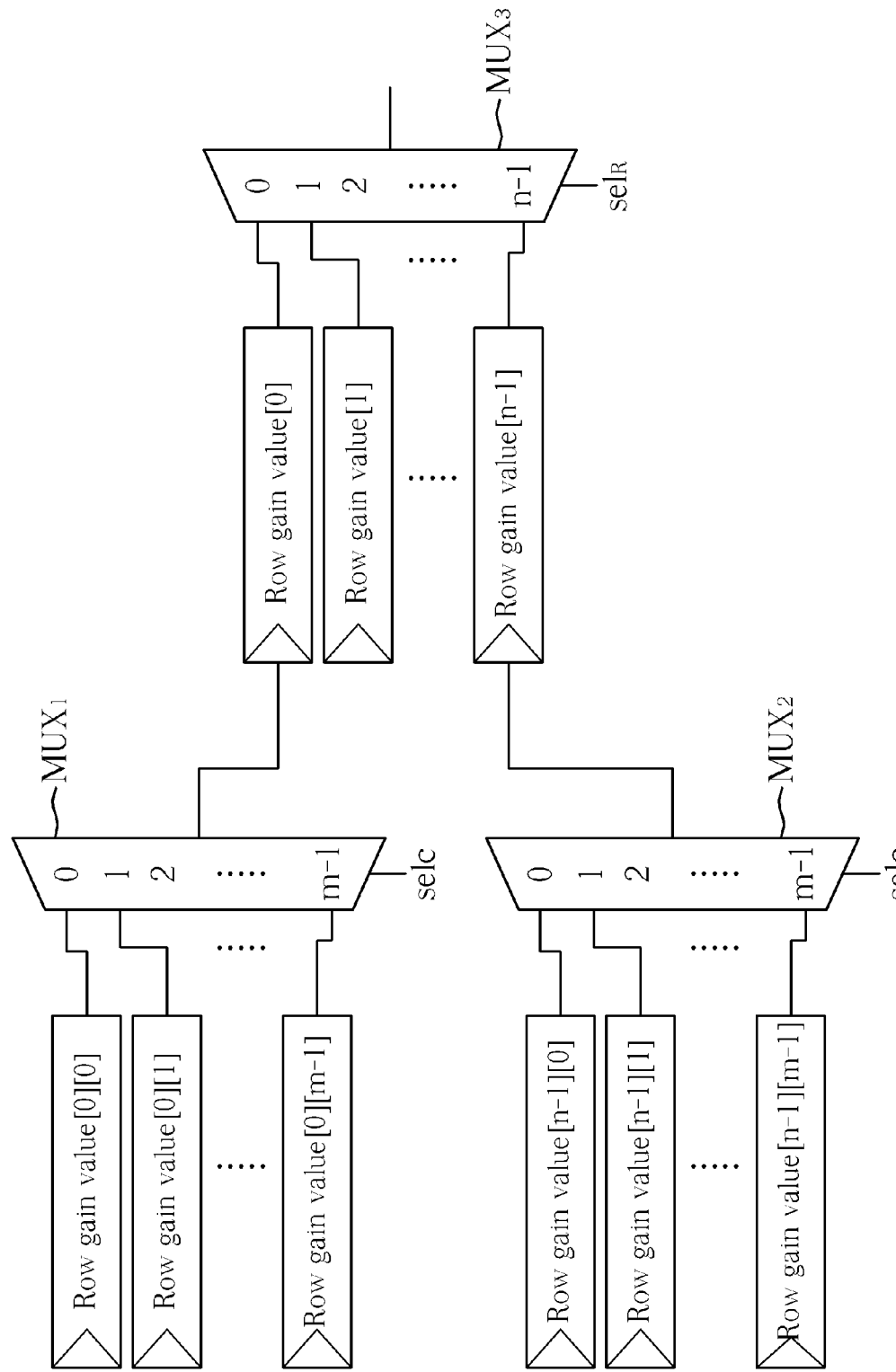
FIG. 6 is a schematic diagram illustrating the structure of the control unit for selecting amplifying parameters for each pixel, according to one embodiment of the present invention.

FIG. 6 is a schematic diagram illustrating the structure of the control unit for selecting amplifying parameters for each pixel, according to one embodiment of the present invention. Such structure comprises a plurality of multiplexers $Mux_1$, $Mux_2$ and $Mux_3$, which can be incorporated into the control unit but also can be independent from the control unit. As shown in FIG. 6, the image sensing matrix 301 is a matrix with M columns×N rows. The multiplexers $Mux_1$, $Mux_2$ select image sensing unit gains of columns from the multiplexer via the selecting signal $Sel_c$, and then the multiplexer $Mux_3$ selects image sensing unit gains of rows via the selecting signal $Sel_R$. That is, the circuit shown in FIG. 6 selects gain values based on addresses of the image sensing units (in which row and which column). However, the scope of the present invention is not limited to the embodiment shown in FIG. 6, any circuits that can reach the function for the circuit in FIG. 6 should fall in the scope of the present invention.

The amplifier 305 can utilize the same amplifying parameters to amplify each image sensing signals $IS_{11}$-$IS_{nm}$, but also can utilize different amplifying parameters to amplify at least part of the image sensing signals $IS_{11}$-$IS_{nm}$. In one embodiment, the image sensing units in the same row or the same column utilizes the same amplifying parameters. The amplifying parameter can be set to desired brightness information. In one embodiment, the control unit 302 determines values of the amplifying parameters that each of the image sensing unit corresponds to according to a brightness value of the image sensing signal that the image sensing unit derives in a previous image or a current image.

Figure 1:
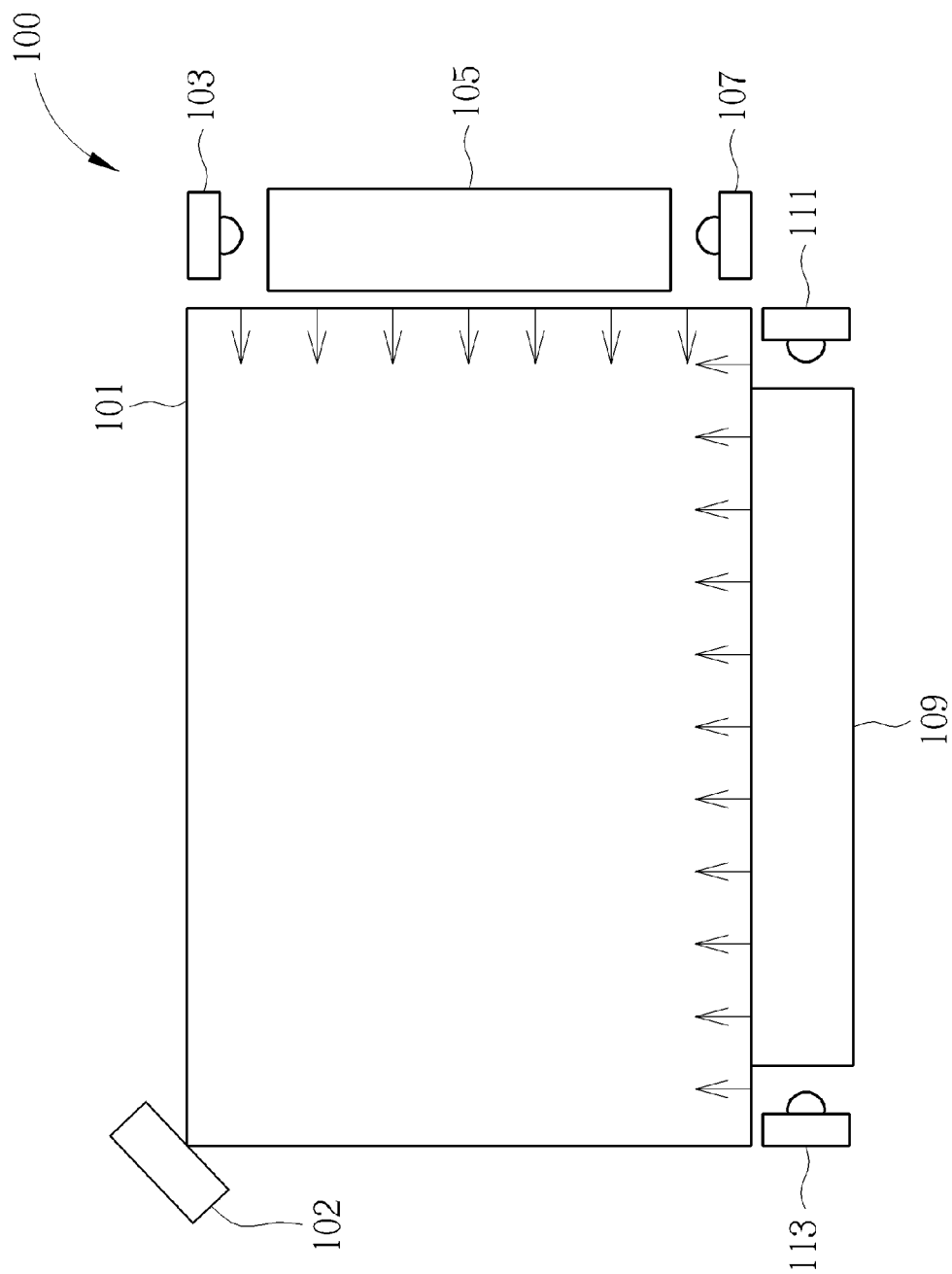
FIG. 1 is a schematic diagram illustrating a prior art optical touch control apparatus.
Figure 2:
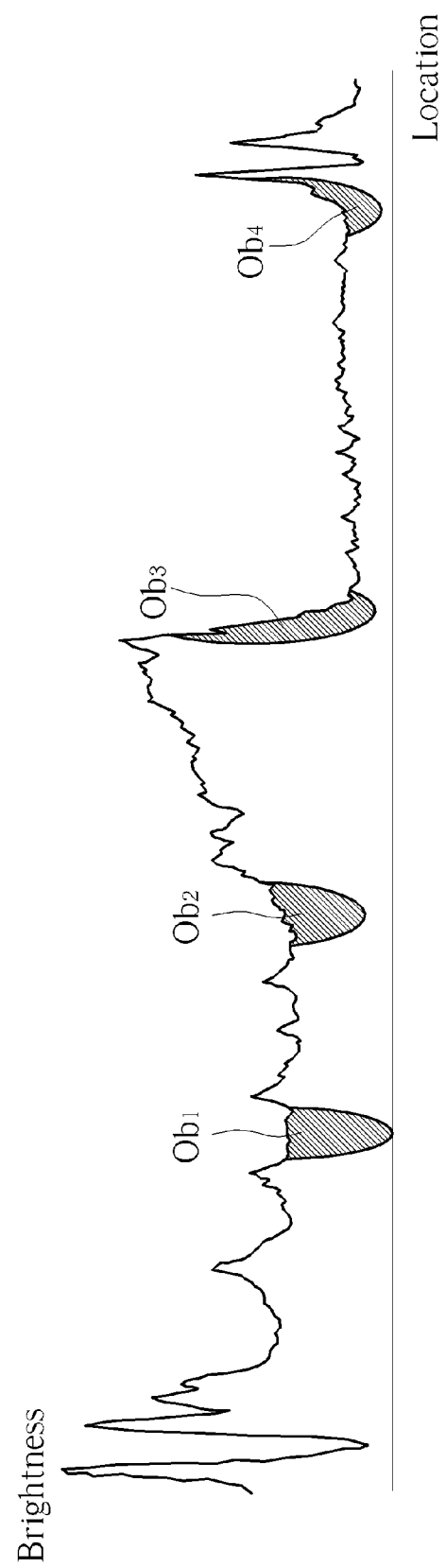
FIG. 2 is a schematic diagram illustrating brightness distribution for the background light image derived by a prior art image sensor.
Figure 7:
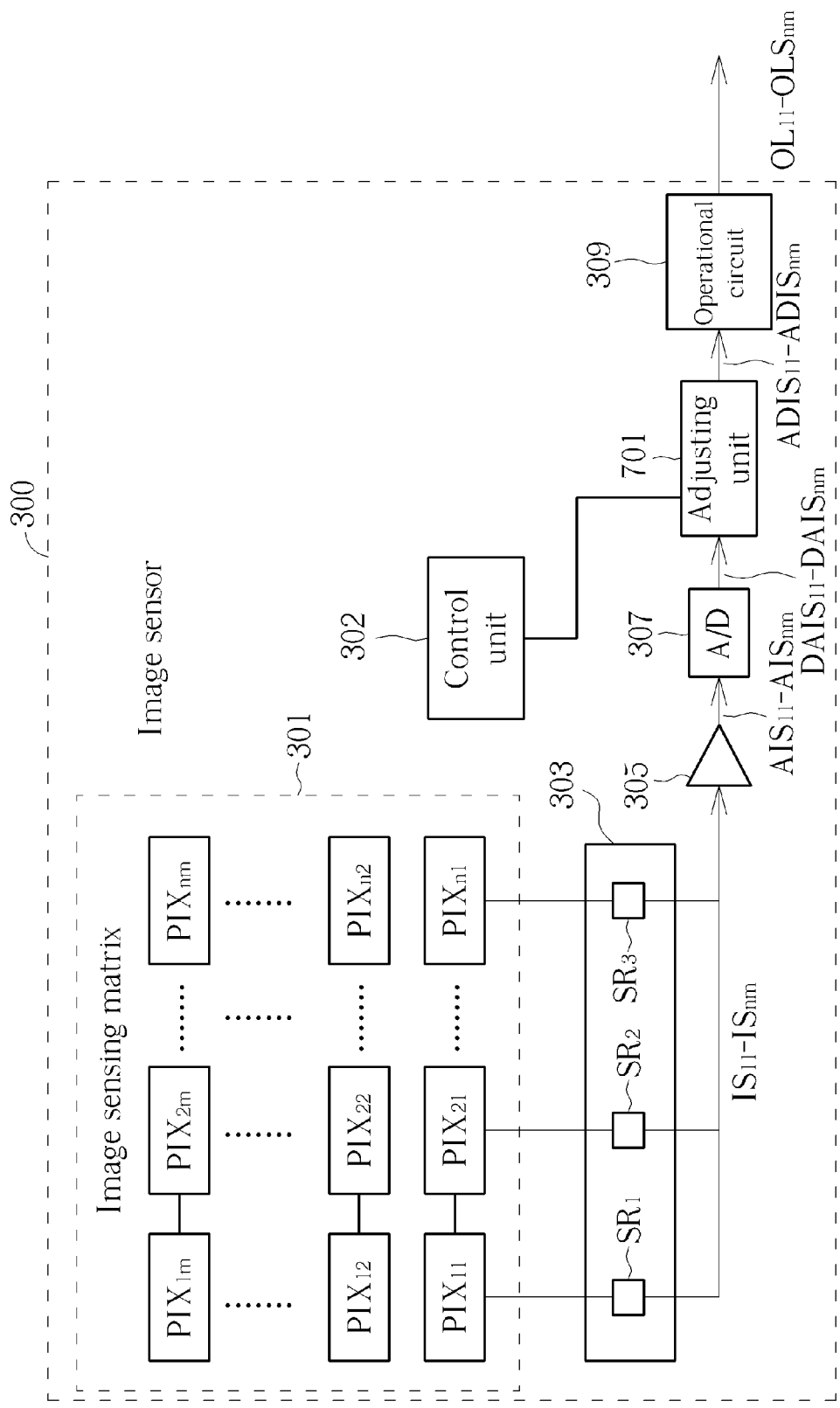
FIG. 7 is a schematic diagram illustrating an image sensor according to another embodiment of the present invention.

FIG. 7 is a schematic diagram illustrating an image sensor according to another embodiment of the present invention. One difference between the embodiments shown in FIG. 3 and FIG. 7 is that the embodiment shown in FIG. 3 adjusts the amplifying parameters of the analog image sensing signals, but the embodiment shown in FIG. 7 firstly amplifies and digitalizes the analog image signals $IS_{11}$-$IS_{nm}$ to generate the digital amplified image signals $DAIS_{11}$-$DAIS_{nm}$, and then utilizes an adjusting unit to adjust the digital amplified image signals $DAIS_{11}$-$DAIS_{nm}$ to generate the adjusted digital image sensing signals $ADIS_{11}$-$ADIS_{nm}$. Therefore, comparing with the embodiment in FIG. 2, the embodiment in FIG. 7 further comprise an adjusting unit 701, which is also controlled by the control unit 302. In one embodiment the amplifier 305 is excluded such that the analog image signals $IS_{11}$-$IS_{nm}$ are directly adjusted by the adjusting unit 701 without being amplified. How to adjust a digital signal to become larger or smaller is well known by persons skilled in the art, and the selecting, setting for the adjusting parameter are well known by persons skilled in the art, thus it is omitted for brevity here. Please note the adjusting parameters for adjusting the digital amplified image signals $DAIS_{11}$-$DAIS_{nm}$ can be the same or different. In one embodiment, the adjusting unit 701 utilizes at least two adjusting parameters to adjust two of the digital amplified image signals $DAIS_{11}$-$DAIS_{nm}$. For example, utilizing a first amplifying parameter to amplify the digital amplified image signals $DAIS_{32}$, but utilizing a second amplifying parameter to amplify the digital amplified image signals $DAIS_{46}$. The purpose of such action can be controlling the brightness information generated based on the brightness value of the image sensing units $PIX_{11}$-$PIX_{nm}$ to fall in a predetermined range, the same as above-mentioned purpose, but can be other purposes. Additionally, in another embodiment, the adjusting unit 701 utilizes at least two of the adjusting parameters with different values to adjust two of the image sensing signals only when the images sensing units are indifferent rows and different columns.

Figure 8:
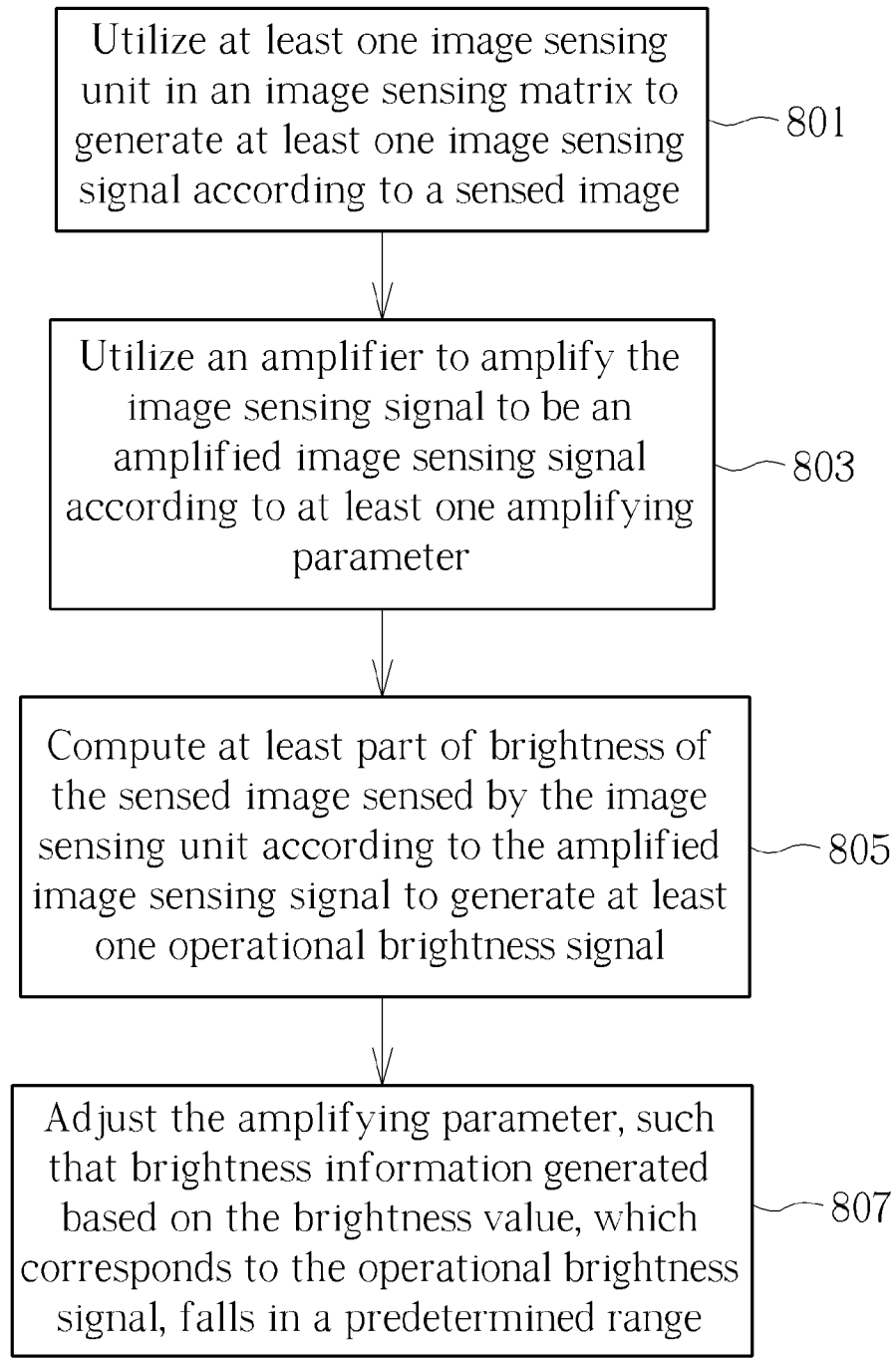
FIG. 8 is a flow chart illustrating an image sensing method according to one embodiment of the present invention.

FIG. 8 is a flow chart illustrating an image sensing method according to one embodiment of the present invention. The method corresponding to the embodiment shown in FIG. 3 and includes the following steps:

Step 801

Utilize at least one image sensing unit (ex. $PIX_{11}$-$PIX_{nm}$) in an image sensing matrix (ex. 301) to generate at least one image sensing signal (ex. $IS_{11}$-$IS_{nm}$) according to a sensed image.

Step 803

Utilize an amplifier (ex. 305) to amplify the image sensing signal to be an amplified image sensing signal according to at least one amplifying parameter (ex. $AIS_{11}$-$AIS_{nm}$).

Step 805

Compute at least part of brightness of the sensed image sensed by the image sensing unit according to the amplified image sensing signal to generate at least one operational brightness signal (ex. $OL_{11}$-$OL_{nm}$).

Step 807

Adjust the amplifying parameter, such that brightness information generated based on the brightness value, which corresponds to the operational brightness signal, falls in a predetermined range.

Figure 9:
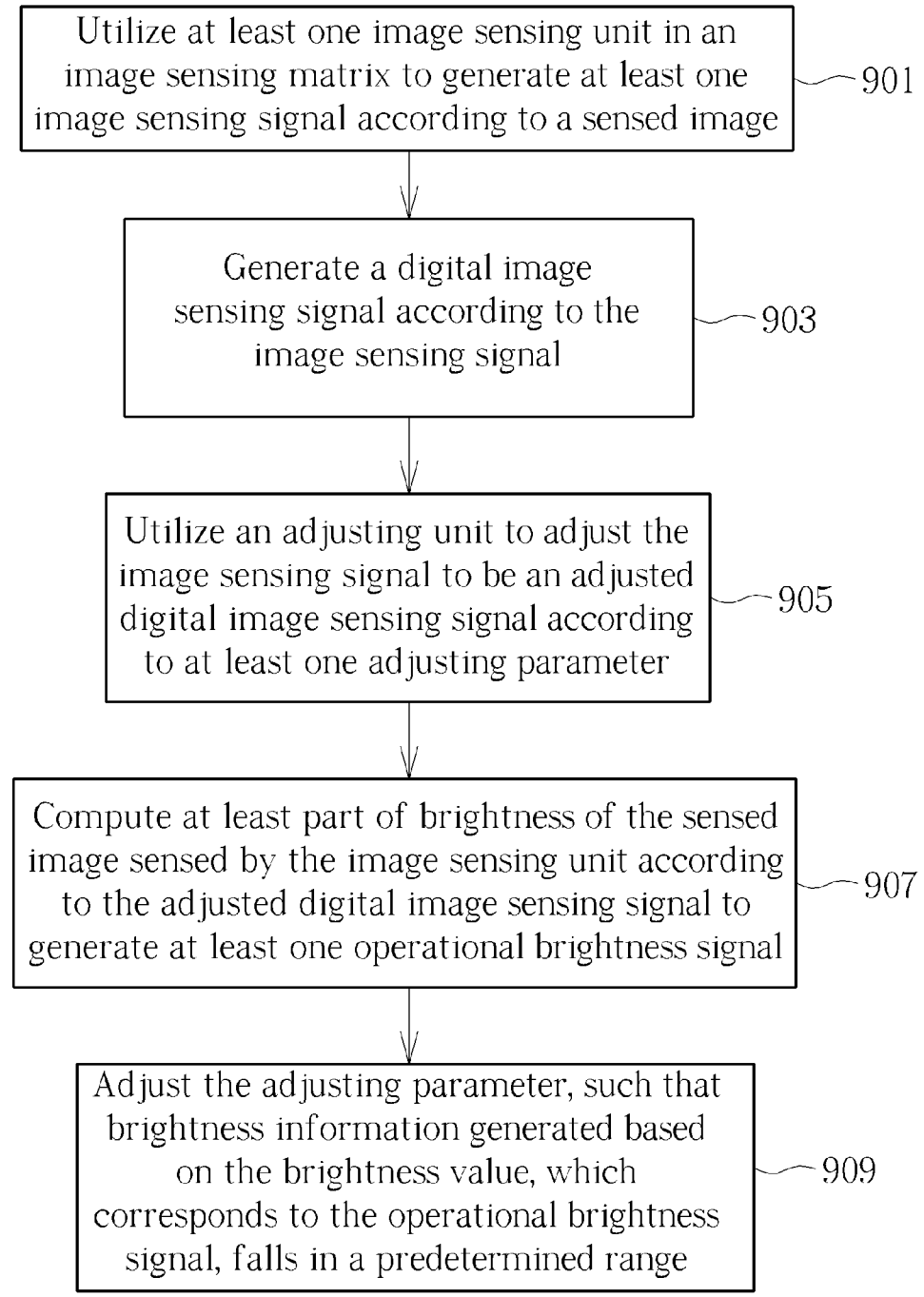
FIG. 9 is a flow chart illustrating an image sensing method according to another embodiment of the present invention.

FIG. 9 is a flow chart illustrating an image sensing method according to another embodiment of the present invention. The method corresponding to the embodiment shown in FIG. 7 and includes the following steps:

Step 901

Utilize at least one image sensing unit (ex. $PIX_{11}$-$PIX_{nm}$) in an image sensing matrix (ex. 301) to generate at least one image sensing signal (ex. $IS_{11}$-$IS_{nm}$) according to a sensed image.

Step 903

Generate a digital image sensing signal according to the image sensing signal.

As above-mentioned description, the image sensing signal can be amplified and digitalized to generate the digital image sensing signal, or be directly digitalized to generate the digital image sensing signal.

Step 905

Utilize an adjusting unit (ex. 701) to adjust the image sensing signal to be an adjusted digital image sensing signal according to at least one adjusting parameter (ex. $ADIS_{11}$-$ADIS_{nm}$).

Step 907

Compute at least part of brightness of the sensed image sensed by the image sensing unit according to the adjusted digital image sensing signal to generate at least one operational brightness signal (ex. $OL_{11}$-$OL_{nm}$).

Step 909

Adjust the adjusting parameter, such that brightness information generated based on the brightness value, which corresponds to the operational brightness signal, falls in a predetermined range.

In view of above-mentioned embodiment, the distribution for the background light image brightness of the image sensing apparatus can be adjusted to be normal via adjusting the amplifying parameter or the adjusting parameter, without complicated computing steps. By this way, the problem of wrongly determining the location and the barycentre of the object can be solved. Additionally, utilizing different amplifying parameters or adjusting parameters to process image sensing signals corresponding to different image sensing units can enlarger the application range for the image sensor of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image sensor, comprising:
    an image sensing matrix, comprising at least one image sensing unit, for generating at least one image sensing signal according to a sensed image;
    an analog to digital converter, for converting the image sensing signal to a digital image sensing signal;
    a digital amplifier, configured to adjust the digital image sensing signal to be an adjusted digital image sensing signal according to at least one adjusting parameter and the digital image sensing signal;
    an operational circuit, for computing at least part of brightness of the sensed image sensed by the image sensing unit according to the adjusted digital image sensing signal to generate at least one operational brightness signal; and
    a control circuit, configured to provide the adjusting parameter for at least one row or at least one column of the image sensing units, such that brightness information generated based on brightness values, which corresponds to the operational brightness signal, falls in a predetermined range,
    wherein the image sensing matrix comprises a plurality of the image sensing units and utilizes a plurality of the image sensing units in an image sensing window to sense the image, where the control circuit controls a sum of the brightness values corresponding to at least part of the operational brightness signal to fall in the predetermined range, wherein the operational brightness signal corresponds to one row or one column of the image sensing units in the image sensing window.

2. The image sensor of claim 1, wherein the control circuit controls the digital amplifier to utilize one of the adjusting parameters to amplify one of the image sensing signals to form the adjusted digital image sensing signal.

3. The image sensor of claim 1, wherein the control circuit controls a plurality of the digital image sensing signals to be summed to generate a combinational digital image sensing signal, and controls the digital amplifier to utilize one of the adjusting parameters to adjust the combinational digital image sensing signal to form the adjusted digital image sensing signal.

4. The image sensor of claim 1, wherein the digital amplifier utilizes the adjusting parameters with the same or different values to adjust different the image sensing signals.

5. The image sensor of claim 4, wherein the control circuit determines values of the adjusting parameters that each of the image sensing unit corresponds to according to a brightness value of the image sensing signal that the image sensing unit derives in a previous image or a current image.

6. The image sensor of claim 1, wherein the image sensing units utilize the same adjusting parameter if the image sensing units are located in the same row or in the same column.

7. An image sensor, comprising:
    an image sensing matrix, comprising at least one image sensing unit, for generating at least one image sensing signal according to a sensed image;
    an analog to digital converter, for converting the image sensing signal to a digital image sensing signal;
    a digital amplifier, configured to adjust the digital image sensing signal to be an adjusted digital image sensing signal according to at least one adjusting parameter and the digital image sensing signal;
    an operational circuit, for computing at least part of brightness of the sensed image sensed by the image sensing unit according to the adjusted digital image sensing signal to generate at least one operational brightness signal; and
    a control circuit, configured to provide the adjusting parameter for at least one row or at least one column of the image sensing units, such that brightness information generated based on brightness values, which corresponds to the operational brightness signal, falls in a predetermined range;

wherein the image sensing matrix comprises a plurality of the image sensing units and utilizes a plurality of the image sensing units in an image sensing window to sense the image, where the control circuit controls an average of the brightness values corresponding to at least part of the operational brightness signal to fall in the predetermined range, wherein the operational brightness signal corresponds to one row or one column of the image sensing units in the image sensing window.

8. An image sensor, comprising:

an image sensing matrix, comprising at least one image sensing unit, for generating at least one image sensing signal according to a sensed image;

an analog to digital converter, for converting the image sensing signal to a digital image sensing signal;

a digital amplifier, configured to adjust the digital image sensing signal to be an adjusted digital image sensing signal according to at least one adjusting parameter and the digital image sensing signal;

an operational circuit, for computing at least part of brightness of the sensed image sensed by the image sensing unit according to the adjusted digital image sensing signal to generate at least one operational brightness signal; and a control circuit, configured to provide the adjusting parameter for at least one row or at least one column of the image sensing units, such that brightness information generated based on brightness values, which corresponds to the operational brightness signal, falls in a predetermined range;

wherein the image sensing matrix comprises a plurality of the image sensing units and utilizes a plurality of the image sensing units in an image sensing window to sense the image, where the control circuit controls a difference of the brightness values corresponding to at least two of the operational brightness signals to fall in the predetermined range, wherein the operational brightness signal corresponds to one row or one column of the image sensing units in the image sensing window.

\* \* \* \* \*